US011869365B2

(12) United States Patent
Kim et al.

(10) Patent No.: US 11,869,365 B2
(45) Date of Patent: Jan. 9, 2024

(54) APPARATUS AND METHOD FOR DETECTING UNMANNED AERIAL VEHICLE

(71) Applicant: Electronics and Telecommunications Research Institute, Daejeon (KR)

(72) Inventors: Young Il Kim, Sejong-si (KR); Seong Hee Park, Daejeon (KR); Soon Yong Song, Daejeon (KR); Geon Min Yeo, Daejeon (KR); Il Woo Lee, Daejeon (KR); Wun Cheol Jeong, Daejeon (KR); Tae Wook Heo, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/028,345

(22) Filed: Sep. 22, 2020

(65) Prior Publication Data
US 2021/0092277 A1 Mar. 25, 2021

(30) Foreign Application Priority Data

Sep. 23, 2019 (KR) .................. 10-2019-0117095
Jul. 13, 2020 (KR) .................. 10-2020-0085911

(51) Int. Cl.
*G08G 5/00* (2006.01)
*H04N 7/18* (2006.01)
(Continued)

(52) U.S. Cl.
CPC .......... *G08G 5/0026* (2013.01); *G06V 20/13* (2022.01); *G06V 20/52* (2022.01); *G08G 5/0073* (2013.01);
(Continued)

(58) Field of Classification Search
None
See application file for complete search history.

(56) References Cited

U.S. PATENT DOCUMENTS

2009/0104963 A1* 4/2009 Burman .............. G07F 17/3223
463/22
2016/0092739 A1* 3/2016 Oami ................. G06K 9/00771
348/159
(Continued)

FOREIGN PATENT DOCUMENTS

KR 10-2009-0116102 11/2009
KR 10-2011-0092502 8/2011
(Continued)

OTHER PUBLICATIONS

Detmold et al., "Surprisal-aware Scheduling of PTZ Cameras", 2009, IEEE, Sep. 2, 2009 Third ACM/IEEE International Conference on Distributed Smart Cameras (ICDSC). (Year: 2009).*
(Continued)

*Primary Examiner* — James M Anderson, II
(74) *Attorney, Agent, or Firm* — KILE PARK REED & HOUTTEMAN PLLC

(57) ABSTRACT

Provided is a method and apparatus for detecting an unmanned aerial vehicle (UAV). The method of detecting a UAV includes receiving images from one or more cameras positioned in a UAV protected area; analyzing the received image to extract a UAV from the received image; and providing data related to the extracted UAV to train a UAV detection model, wherein photographing times or photographing positions of the one or more cameras are variably controlled.

14 Claims, 7 Drawing Sheets

(51) Int. Cl.
  *G06V 20/13* (2022.01)
  *H04N 23/66* (2023.01)
  *H04N 23/69* (2023.01)
  *H04N 23/90* (2023.01)
  *H04N 23/695* (2023.01)
  *G06V 20/52* (2022.01)

(52) U.S. Cl.
  CPC .............. *H04N 7/18* (2013.01); *H04N 23/66* (2023.01); *H04N 23/69* (2023.01); *H04N 23/695* (2023.01); *H04N 23/90* (2023.01)

(56) References Cited

U.S. PATENT DOCUMENTS

| | | | | |
|---|---|---|---|---|
| 2017/0132474 A1* | 5/2017 | Matsumoto | ........ | G06K 9/00771 |
| 2018/0329020 A1 | 11/2018 | Hafizovic et al. | | |
| 2019/0235047 A1 | 8/2019 | Hsiao et al. | | |
| 2019/0266410 A1 | 8/2019 | Seeber et al. | | |
| 2020/0043346 A1* | 2/2020 | Vacek | ................ | B64C 39/024 |

FOREIGN PATENT DOCUMENTS

| KR | 20180016187 | 2/2018 |
|---|---|---|
| KR | 10-1989585 | 6/2019 |

OTHER PUBLICATIONS

Moritz Kohls et al., "Expected Coverage of Random Walk Mobility Algorithm", Department of Electrical Engineering and Information Technology, arXiv:1611.02861v2 [stat.AP] Jan. 30, 2018; pp. 1-13.
Evşen Yanmaz et al., "A Discrete Stochastic Process for Coverage Analysis of Autonomous UAV Networks", IEEE Globecom 2010 Workshop on Wireless Networking for Unmanned Aerial Vehicles, pp. 1777-1782.

* cited by examiner

APPARATUS AND METHOD FOR DETECTING UNMANNED AERIAL VEHICLE

CLAIM FOR PRIORITY

This application claims priority to Korean Patent Applications No. 10-2019-0117095 filed on Sep. 23, 2019 and No. 10-2020-0085911 filed on Jul. 13, 2020 in the Korean Intellectual Property Office (KIPO), the entire contents of which are hereby incorporated by reference.

BACKGROUND

1. Technical Field

Example embodiments of the present invention relate to a method and apparatus for detecting an unmanned aerial vehicle (UAV), and more specifically, to a method and apparatus for detecting a UAV using a random arrangement and random time photographing of cameras.

2. Related Art

Recently, small unmanned aerial vehicles (UAV) invading airports, public places, and protected regions are causing social unrest. In particular, there has been discussion on various technologies for protecting lives of people and property from being attacked by military purpose small UAVs. As applicable technologies, radar-based detection technology, image signal analysis-based UAV detection technology, noise characteristic-based UAV detection technology, and the like have been suggested but there are limitations in detecting a small UAV.

Since an apparatus for detecting a UAV using an image has difficulty in detecting a UAV when a UAV image is acquired at a remote site, a zoom lens is required to acquire a UAV image having a certain size or more. In addition, the apparatus requires a large number of cameras which increases a financial burden.

SUMMARY

Accordingly, example embodiments of the present invention provide a method that allows an unmanned aerial vehicle (UAV) to be detected using a random arrangement and random time photographing of cameras.

Example embodiments of the present invention provide an apparatus that allows a UAV to be detected using the method of detecting the UAV.

Example embodiments of the present invention provide a method of detecting an unmanned aerial vehicle (UAV), the method including receiving images from one or more cameras positioned in a UAV protected area, analyzing the received image to extract a UAV from the received image, and providing data related to the extracted UAV to train a UAV detection model, wherein photographing times or photographing positions of the one or more cameras are variably controlled.

An area covered by the one or more cameras may be set to be smaller than an area of the UAV protected area.

Installation positions of the one or more cameras may be randomly set, and a focal length of each of the one or more cameras may be fixedly set after zooming.

The method may further include providing signals for controlling the photographing times of the one or more cameras to the respective cameras.

The providing of the signals for controlling the photographing times of the one or more cameras to the respective cameras may include generating a pseudo random binary sequence (PRBS), performing a time delay on the PRBS using a different offset to generate a photographing time control signal for each of the one or more cameras, and transmitting the generated photographing time control signal to each of the one or more cameras.

The method may further include providing signals for controlling positions of the one or more cameras to the respective cameras.

The providing of the signals for controlling the positions of the one or more cameras to the respective cameras may include generating a pseudo random number (PRN), randomly setting position coordinates of each of the one or more cameras according to a photographing start time of the camera on the basis of the PRN, generating a position control signal for moving each of the one or more cameras to the corresponding position coordinates, and transmitting the position control signal to each of the one or more cameras.

The position control signal may include a Pan-Tilt-Zoom (PTZ) control signal.

Example embodiments of the present invention provide an apparatus for detecting an unmanned aerial vehicle (UAV) in association with one or more image analysis devices, the apparatus including a processor and a memory which stores at least one command to be executed through the processor, wherein the at least one command includes a command to cause data related to a UAV extracted from each of the image analysis devices configured to extract a UAV from images collected from one or more cameras positioned within a UAV protected region to be received, a command to cause a UAV detection model to be trained using the data related to the extracted UAV, and a command to cause the UAV detection model to be provided to the one or more image analysis devices, wherein photographing times or photographing positions of the one or more cameras are variably controlled.

An area covered by the one or more cameras may be set to be smaller than an area of a UAV protected area.

Installation positions of the one or more cameras may be randomly set, and a focal length of each of the one or more cameras may be fixedly set after zooming.

The at least one command may further include a command to cause signals for controlling the photographing times of the one or more cameras to be provided to the respective cameras.

The command to cause the signal for controlling the photographing times of the one or more cameras to be provided to each camera may include a command to cause a pseudo random binary sequence (PRBS) to be generated, a command to cause a time delay on the PRBS to be performed using a different offset to generate a photographing time control signal for each of the one or more cameras, and a command to cause the generated photographing time control signal to be transmitted to each of the one or more cameras.

The at least one command may further include a command to cause signals for controlling positions of the one or more cameras to be provided to the respective cameras.

The command to cause the signals for controlling the positions of the one or more cameras to be provided to the respective cameras may include a command to cause a pseudo random number (PRN) to be generated, a command to cause randomly set position coordinates of each of the one or more cameras according to a photographing start time of the camera on the basis of the PRN, a command to cause a position control signal for moving each of the one or more cameras to the corresponding position coordinates to be generated, and a command to cause the position control signal to be transmitted to each of the one or more cameras.

The position control signal may include a Pan-Tilt-Zoom (PTZ) control signal.

BRIEF DESCRIPTION OF DRAWINGS

Example embodiments of the present invention will become more apparent by describing example embodiments of the present invention in detail with reference to the accompanying drawings, in which.

DESCRIPTION OF EXAMPLE EMBODIMENTS

While the present invention is susceptible to various modifications and alternative embodiments, specific embodiments thereof are shown by way of example in the accompanying drawings and will be described. However, it should be understood that there is no intention to limit the present invention to the particular embodiments disclosed, but on the contrary, the present invention is to cover all modifications, equivalents, and alternatives falling within the spirit and scope of the present invention.

It will be understood that, although the terms first, second, etc. may be used herein to describe various elements, the elements should not be limited by the terms. The terms are only used to distinguish one element from another. For example, a first element could be termed a second element, and, similarly, a second element could be termed a first element without departing from the scope of the present invention. As used herein, the term "and/or" includes any one or combination of a plurality of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described with reference to the accompanying drawings in detail.

Figure 1:
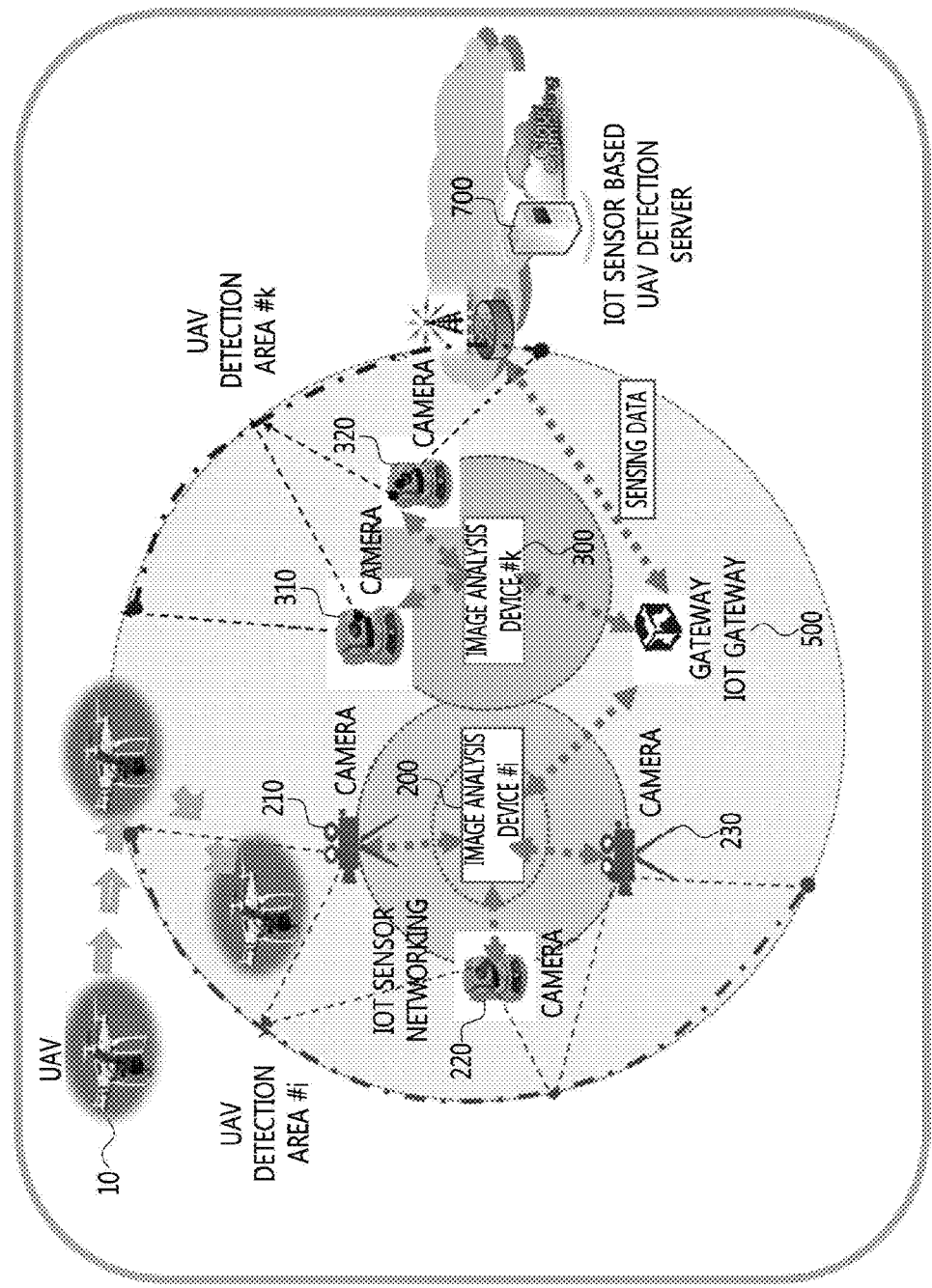
FIG. 1 is an overall conceptual diagram illustrating a system of detecting an unmanned aerial vehicle (UAV) on the basis of an image signal according to an embodiment of the present invention.

FIG. 1 is an overall conceptual diagram illustrating a system of detecting an unmanned aerial vehicle (UAV) on the basis of an image signal according to an embodiment of the present invention.

In the system of detecting a UAV on the basis of an image signal according to the embodiment of the present invention, a UAV detection area for monitoring invasion of a UAV 10 may include a plurality of small-scale UAV detection areas (detection area #i, ⊚, detection area #k) according to an installation method of cameras.

Referring to FIG. 1, a plurality of cameras 210, 220 and 230 located in a UAV detection area #i capture images of the UAV 10 entering the UAV detection area #i and transmit the captured images to an image analysis device #i 200. The image analysis device #i 200 analyzes the images received from the plurality of cameras 210, 220, and 230 and provides a result of detecting the UAV 10 and the related image to an apparatus 700 for detecting a UAV on the basis of an Internet of Things (IoT) sensor through an IoT gateway 500.

In addition, even in the UAV detection area #k, a plurality of cameras 310 and 320 and an image analysis device #k 300 may detect a UAV in association with each other and transmit the related image to the apparatus 700 for detecting a UAV on the basis of the IoT sensor.

The cameras 210, 220, 230, 310, and 320 that capture images of the UAV and the image analysis devices 200 and 300 that analyze the images captured by the cameras 210, 220, 230, 310, and 320 may be interconnected through IoT networking and perform cooperative operation sharing information about the detected UAV (a position, a speed, a direction of movement, and the like). The apparatus 700 for detecting a UAV on the basis of the IoT sensor may extract a UAV object from the image including the UAV received from the image analysis devices 200 and 300. The apparatus 700 for detecting a UAV on the basis of the IoT sensor generates a UAV detection learning model through deep learning on the extracted UAV object and provides the UAV detection learning model to the image analysis devices 200 and 300. Each of the image analysis devices 200 and 300 may perform an inference task of detecting and classifying a UAV using the UAV detection model in real time on the site.

Typically, in order to protect a specific area from invasion of a UAV by analyzing image characteristics of a UAV, the protected region needs to be monitored in real time for twenty-four hours per day using cameras. In addition, when UAV detection through deep learning is used, the probability of a small UAV being detected is low because the size of the UAV image is significantly reduced in proportion to the distance.

In the present invention, in order to protect lives of people and physical assets from invasion of a UAV, a plurality of zoom cameras are installed, and as will be described below through the following embodiments, the photographing time and the photographing position of the camera are randomly controlled so that the number of cameras used for acquiring and analyzing a UAV image may be effectively reduced.

In addition, in the present invention, a method of configuring a common device for analyzing images captured by a plurality of cameras and analyzing images captured by the cameras at a random location and random time is proposed.

Figure 2:
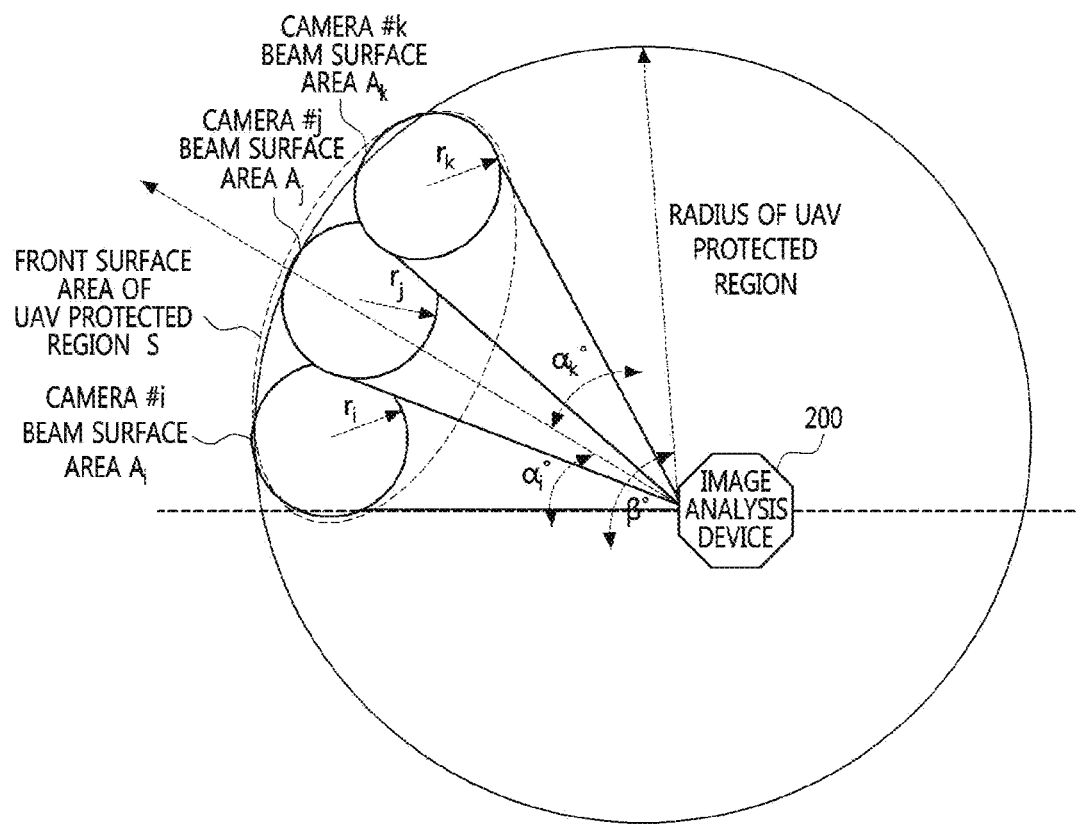
FIG. 2 is a conceptual diagram illustrating an arrangement of UAV detection areas according to an embodiment of the present invention.

FIG. 2 is a conceptual diagram illustrating an arrangement of UAV detection areas according to an embodiment of the present invention.

In FIG. 2, the concept of a camera arrangement for a UAV detection area is shown. In order to construct a front area S for protecting a UAV from intrusion of a UAV, a number of cameras that cover the area need to be installed.

Referring to the embodiment illustrated in FIG. 2, a beam surface area $A_i$ is configured with a camera #i, a beam surface area $A_j$ is configured with a camera #j, and a beam surface area $A_k$ is configured with a camera #k, thereby constructing the front area S for a UAV protected region. An image captured by each camera may be transmitted to the image analysis device 200. In order to distinguish a plurality of camera images received by the image analysis device 200, camera installation position information (e.g., global positioning system (GPS) information) and photographing time information may be used.

When configuring a UAV protected region, the field of view (FOV) of a camera detecting a UAV is closely related to the UAV detection area size. When the FOV of the camera is wide, the area for monitoring the UAV becomes widened, but the size of the UAV appearing on the image becomes smaller, and thus the accuracy of UAV detection and classification through deep learning is degraded.

On the other hand, when capturing an image of a UAV located at a remote site using a zoom lens, the FOV becomes smaller and thus the area for monitoring the UAV is reduced, but the size of the UAV appearing on the image become larger, which increases the accuracy of UAV detection and classification through deep learning. However, when configuring the UAV detection area by setting the FOV of the camera to be small as described above, because a great number of cameras are required, there is a need for a method of overcoming such a constraint.

Figure 3:
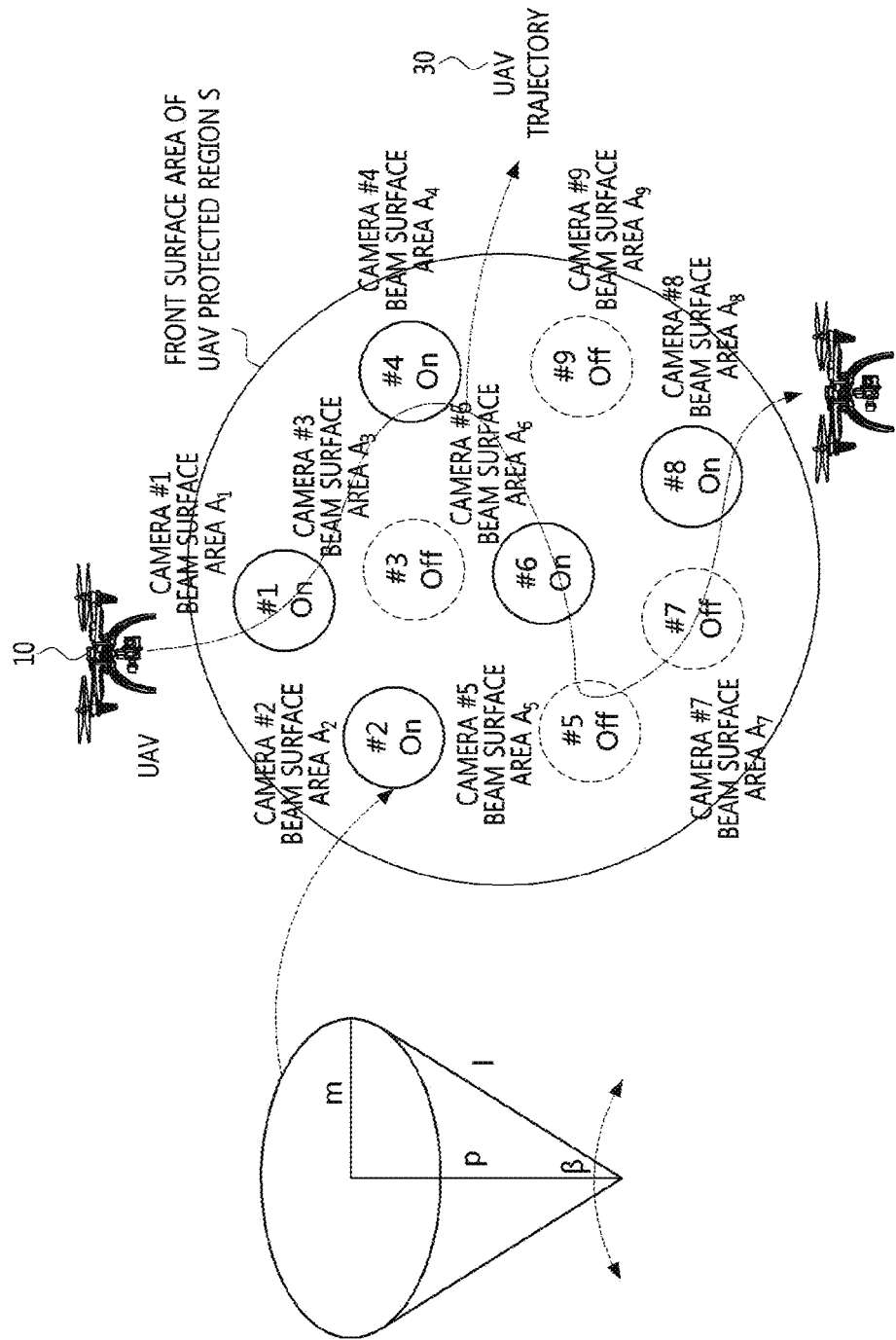
FIG. 3 is a conceptual diagram illustrating a configuration of a UAV detection area using random arrangement and random time photographing of cameras according to an embodiment of the present invention.

FIG. 3 is a conceptual diagram illustrating a configuration of a UAV detection area using random arrangement and random time photographing of cameras according to an embodiment of the present invention.

Referring to FIG. 3, in order to monitor a UAV appearing in a front area of a UAV protected region, a plurality of beam surface areas $A_1, A_2, A_3, A_4, A_5, A_6, A_7, A_8$, and $A_9$ need to be configured using a plurality of cameras to detect a UAV 10 entering the corresponding surface area. Such a configuration proposed in the present invention is provided to reduce the number of surveillance cameras and image analysis devices under the assumption that a UAV flying in the UAV protected region continuously flies in a specific region without hovering.

That is, when the UAV 10 moves along a specific trajectory 30 in the UAV protected region, the UAV 10 is caused to pass through an area including one or more of the beam surface areas $A_1, A_2, A_3, A_4, A_5, A_6, A_7, A_8$, and $A_9$ formed by a plurality of cameras so that the UAV 10 may be detected through a UAV image analysis device associated with the corresponding cameras. In this case, the plurality of beam surface areas $A_1, A_2, A_3, A_4, A_5, A_6, A_7, A_8$, and $A_9$ of the cameras are always set to an "On" state, and thus as all the cameras covering the beam surface areas capture images and transmit the images to the image analysis device 200 (see FIG. 2), the computing load of the image analysis device increases, and a larger number of image analysis devices are required.

In the present invention, such a limitation is overcome through a method of changing a state of a plurality of cameras between the "On" state and an "Off" state. In the embodiment illustrated in FIG. 3, a UAV may be detected by analyzing images provided by cameras (camera #1, camera #2, camera #4, camera #6, and camera #8) that start capturing images.

In this case, when the photographing time of the camera is $t_{sh}$, the number of images captured by the camera per unit time (Frame/sec) is F, the average photographing period of the camera is $T_{av}$, the number of cameras is $N_c$, the surface area of the camera beam is $A_i$, the surface area of the UAV protected region is S, and the probability of a UAV being detected is $P_d$, the size of an area in which a UAV is monitored using cameras is $N_c \times A_i$.

In addition, under the assumption that a UAV is located at an arbitrary location in the UAV protected region and the UAV is detected from a single frame captured by the camera, the probability $P_{Dect\_T}$ of the UAV being detected in the UAV protected region may be defined as Equation 1 below.

$$P_{Dect\_T} = P_d \times \frac{N_C \times A_i}{S} \times \frac{t_{sh}}{T_{av}} \qquad \text{[Equation 1]}$$

When the detection target is a small UAV, a process of detecting an object of the UAV and classifying the object through tracking is performed, which requires a plurality of image frames. In this case, when the number of image frames required for the UAV object detection and tracking process is $F_{req}$, the probability of the UAV being detected within the UAV protected region may be expressed as Equation 2 below.

$$P_{Dect\_T} = P_d \times \frac{N_C \times A_i}{S} \times \frac{t_{sh} \times (F - F_{req})}{T_{av} \times F} \qquad \text{[Equation 2]}$$

Meanwhile, as a method of calculating an area occupied by the UAV entering the UAV protected region, a random walk model, a Markov chain model, or the like may be used.

Assuming that the UAV is flying with a random walk model, when the average occupied area of the UAV during a time Tav, which is the photographing period for all cameras, is Cav, the probability of the UAV being detected within the UAV protected region may be expressed as Equation 3 below.

$$P_{Dect\_T\_rw} = P_d \times \frac{C_{av}}{S} \times \frac{t_{sh} \times (F - F_{req})}{T_{av} \times F} \qquad \text{[Equation 3]}$$

The embodiments according to the present invention may use a method of setting a total photographing period $T_{av}$ that is applied to all cameras in common and allocating a photographing time to each camera within the total photographing period.

According to the embodiment illustrated in FIG. 3 described above, the size of an area in which a UAV is monitored using the cameras may be set to be smaller than the size of the total UAV protected region. With the mobile characteristics of the UAV, even when the area according to the camera arrangement is set to be smaller than the total UAV protected region, the UAV may be effectively detected without significantly lowering the probability of UAV detection.

Figure 4:
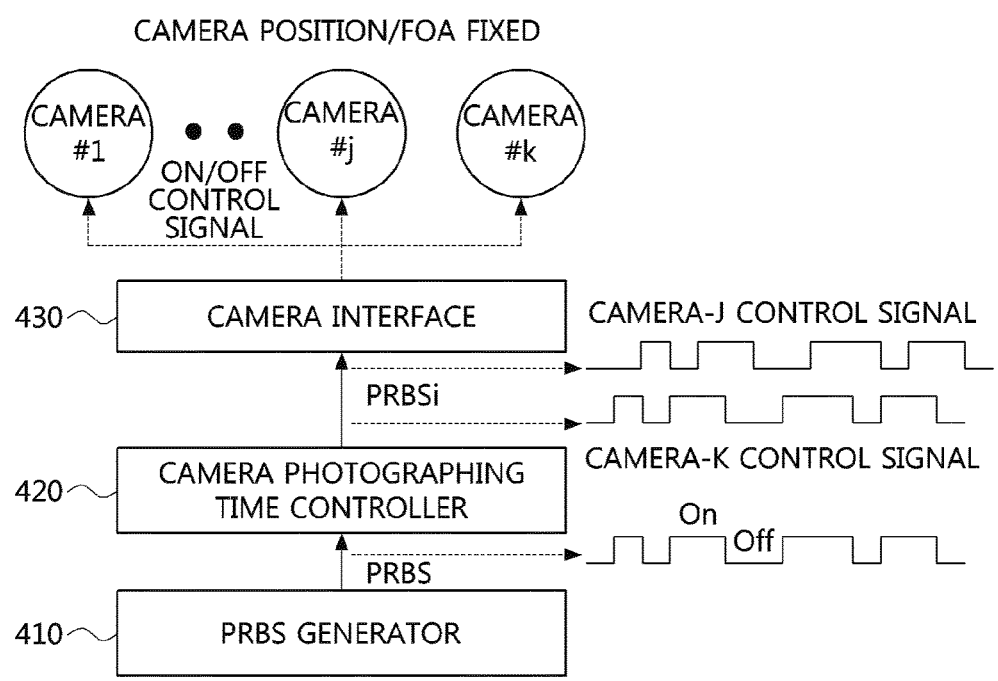
FIG. 4 is a conceptual diagram illustrating camera control for detecting a UAV according to an embodiment of the present invention.

FIG. 4 is a conceptual diagram illustrating camera control for detecting a UAV according to an embodiment of the present invention.

In the embodiment illustrated in FIG. 4, a method of randomly controlling the photographing time of each camera while the position and FOV of the cameras arranged in the UAV protected region are fixed is shown.

In order to implement the method, the system of detecting a UAV according to the present invention may include a pseudorandom binary sequence (PRBS) generator 410, a camera photographing time controller 420, and a camera interface 430. The system of detecting the UAV according to the present invention may include the UAV detection server 700 and the image analysis device 200 as described above in FIG. 1. In addition, the PRBS generator 410, the camera photographing time controller 420, and the camera interface 430, which are components of the system of detecting the UAV, may be disposed in the UAV detection server 700 and the image analysis device 200 in a distributed manner according to the function and implementation as needed.

Assuming that K cameras monitoring a UAV protected region exist, a PRBS is generated using the PRBS generator 410 to arbitrarily determine the photographing times of the K cameras and is used to determine the photographing time of each of the K cameras. The PRBS may be transmitted to the camera photographing time controller 420.

The camera photographing time controller 420 may perform a time delay on the PRBS data received from the PRBS generator 410 to generate values PRBSi corresponding to respective cameras. The values PRBSi include sequences corresponding to the photographing times of the cameras and are transmitted to individual cameras through the camera interface 430. With such a method, the present invention may randomly set the photographing times of the K cameras.

The camera interface 430 may transmit a message for controlling the photographing time of each camera to the camera through a camera control protocol (e.g., Logic Application Control Bus System: LANC).

According to the embodiment described in FIG. 4, a plurality of low-cost cameras may be installed to be directed at a certain position in the UAV protected region, and the photographing time and the photographing time interval are randomly adjusted so that the UAV protected region may be effectively configured without Pan-Tilt-Zoom (PTZ) equipment.

Figure 5:
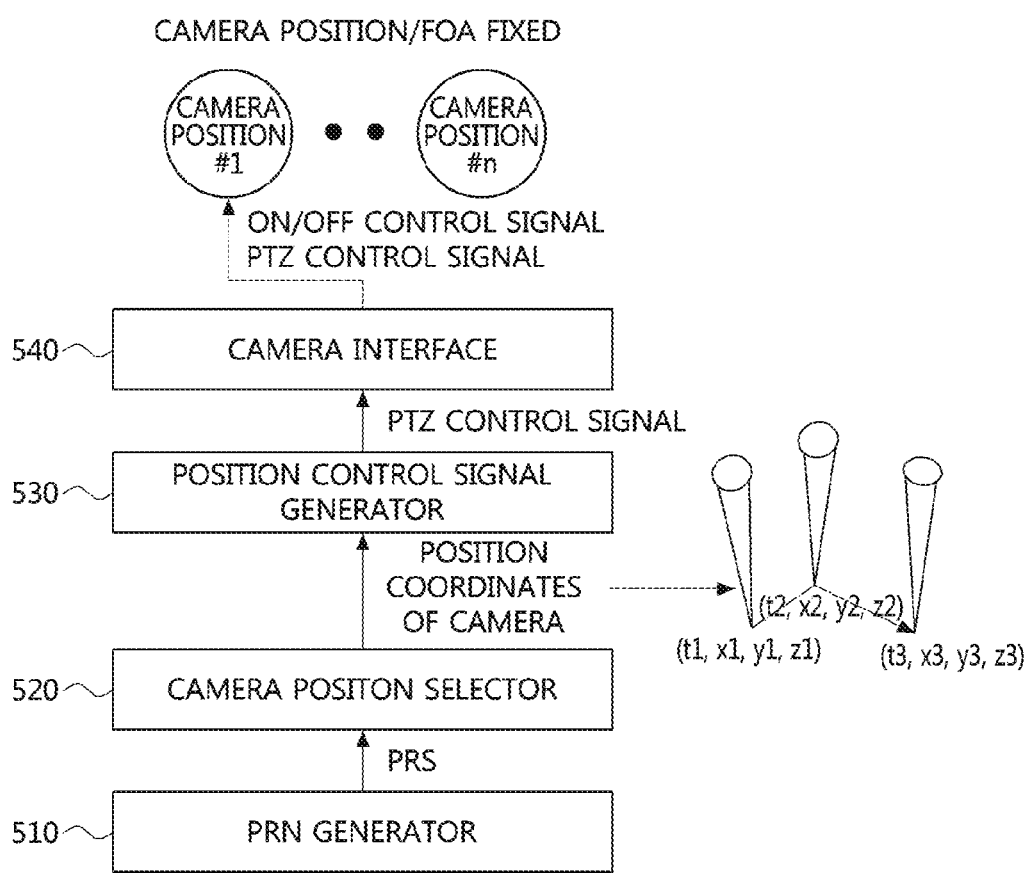
FIG. 5 is a conceptual diagram illustrating camera control for detecting a UAV according to another embodiment of the present invention.

FIG. 5 is a conceptual diagram illustrating camera control for detecting a UAV according to another embodiment of the present invention.

In the embodiment of FIG. 5, in order to efficiently detect a UAV while reducing the number of cameras covering a UAV protected region, a method of controlling the positions and photographing angles of cameras arranged in the UAV protected region is shown. That is, one camera may capture images while continuously moving to several locations within the UAV protected region or moving the lens direction at intervals of time.

In order to implement the method, the system of detecting the UAV may include a pseudorandom number (PRN) generator 510, a camera position selector 520, a position control signal generator 530, and a camera interface 540. The system of detecting the UAV according to the present invention may include the UAV detection server 700 and the image analysis device 200 as described in FIG. 1. In addition, the PRN generator 510, the camera position selector 520, the position control signal generator 530, and the camera interface 540, which are components of the system of detecting the UAV, may be disposed in the UAV detection server 700 and the image analysis device 200 in a distributed manner according to the function and implementation as needed.

The PRN generator 510 may generate a PRN and transmit the generated PRN to the camera position selector 520. The camera position selector 520 may randomly set the position coordinates for each camera (x1, y1, z1), (x2, y2, z2), or (x3, y3, z3) according to the time (t1, t2, t3 ⊚) at which the camera starts to capture an image on the basis of the PRN received from the PRN generator 510.

The position control signal generator 530 generates a position control signal required to move the camera into the position coordinates of the camera and transmits the generated position control signal to the camera interface 540. In this case, the position control signal may include a PTZ control signal. The camera interface 540 may generate a control signal for a PTZ motor attached to the camera to control the position of the camera. In this case, the camera interface may transmit not only a position control signal for the camera but also a photographing ON/OFF signal for the camera to each camera. That is, the embodiments described through FIGS. 3 to 5 may be used independently or in combination with other embodiments.

According to the embodiment described in FIG. 5, only a few number of high-performance PTZ cameras are used to capture and analyze an image at a random time at a random position so that a UAV may be detected in an economical manner.

Figure 6:
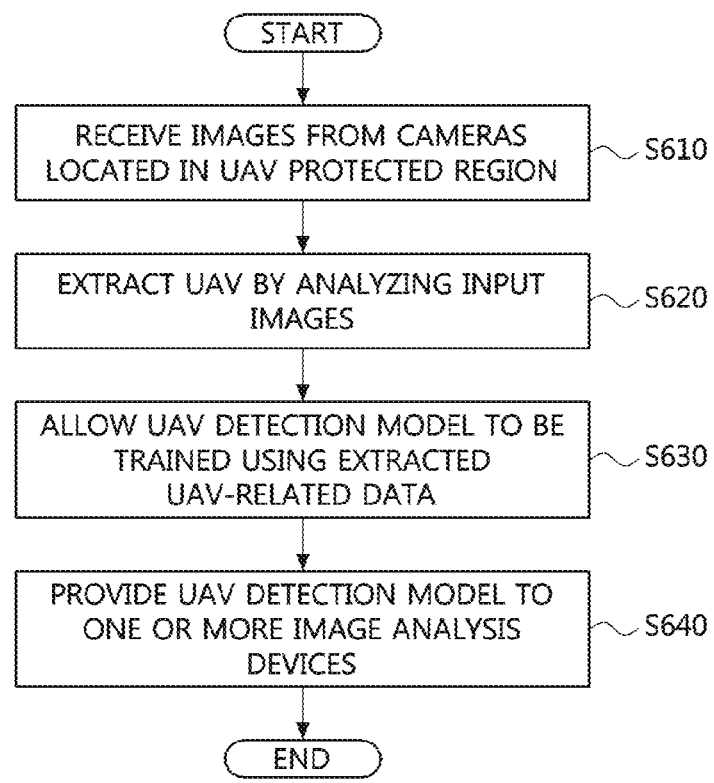
FIG. 6 is a flowchart showing a method of detecting a UAV according to an embodiment of the present invention.

FIG. 6 is a flowchart showing a method of detecting a UAV according to an embodiment of the present invention.

The method of detecting a UAV according to the embodiment of the present invention may be performed by the system of detecting a UAV, more specifically, at least one of the UAV detection server and the image analysis device described through the above embodiments.

The system of detecting the UAV receives images from one or more cameras located in the UAV protected region (S610). In more detail, each image analysis device may receive images from one or more cameras covered by the corresponding image analysis device.

The system of detecting the UAV or the image analysis device may detect a UAV by analyzing the images input from the cameras (S620). The UAV related data is provided to the UAV detection server, and the UAV detection server may allow a UAV detection model to be trained using the extracted UAV related data (S630). The trained and generated UAV detection model is provided to one or more image analysis devices (S640) so that each image analysis device may perform an inference task of detecting and classifying a UAV in real time on the site.

Meanwhile, although not shown in FIG. 6, the method of detecting a UAV according to the present invention may further include providing signals for controlling the photographing times of the one or more cameras to the respective cameras.

In the operation of providing the signals for controlling the photographing times, a PRBS may be generated, and the PRBS may be subject to a time delay using a different offset to generate a photographing time control signal for each camera, and the photographing time control signal may be transmitted to each camera.

The method of detecting a UAV according to the present invention may further include providing signals for controlling the positions of the one or more cameras to the respective cameras. In the operation of providing the signals for controlling the positions, a PRN is generated, the position coordinates of each camera are randomly set according to the time at which the camera starts to capture an image on the basis of the PRN, and a position control signal for moving each camera to the corresponding position coordinates is generated and transmitted to each camera.

In this case, the position control signal may include a PTZ control signal.

Figure 7:
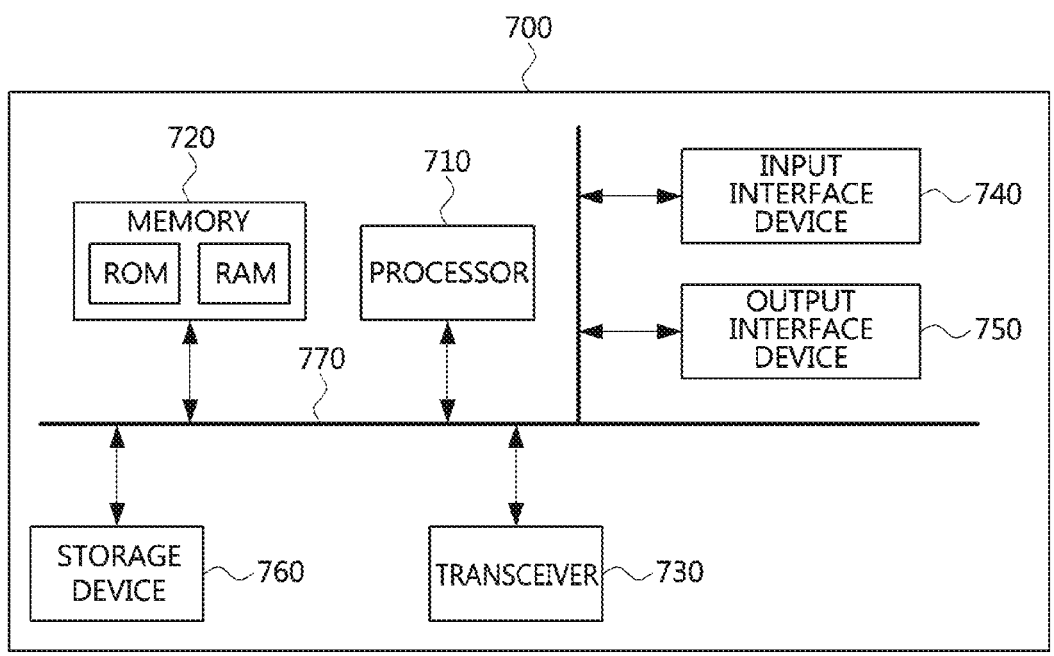
FIG. 7 is a block diagram illustrating an apparatus for detecting a UAV according to an embodiment of the present invention.

FIG. 7 is a block diagram illustrating an apparatus for detecting a UAV according to an embodiment of the present invention.

The apparatus for detecting the UAV according to the embodiment of the present invention includes at least one processor 710, a memory 720 for storing at least one command executed through the processor 710, and a transceiver 730 connected to a network and performing communication.

The apparatus for detecting the UAV may further include an input interface device 740, an output interface device 750, and a storage device 760. The components included in the apparatus 700 for detecting the UAV may be connected to each other through a bus 770 to communicate with each other.

The processor 710 may execute a program command stored in at least one of the memory 720 and the storage device 760. The processor 710 may refer to a central processing unit (CPU), a graphics processing unit (GPU), or a dedicated processor by which the methods according to the embodiments of the present invention are performed. Each of the memory 720 and the storage device 760 may be configured with at least one of a volatile storage medium and a nonvolatile storage medium. For example, the memory 720 may include at least one of a read only memory (ROM) and a random-access memory (RAM).

Here, the at least one command may include a command to cause the processor to receive data related to a UAV extracted by each image analysis apparatus configured to extract the UAV from images collected from one or more cameras located in a UAV protected region, a command to cause a UAV detection model to be trained using the extracted UAV related data, and a command to cause the UAV detection model to be provided to the one or more image analysis devices.

The present invention is characterized in that the photographing times or the photographing positions of the one or more cameras are variably controlled.

The size of an area covered by the one or more cameras may be set to be smaller than the size of the UAV protected region.

The installation positions of the one or more cameras may be randomly set, and the focal length of each camera may be fixedly set after zooming.

The at least one command may further include a command to cause signals for controlling the photographing times of the one or more cameras to be provided to the respective cameras.

The command to cause the signal for controlling the photographing times of the one or more cameras to be provided to the respective cameras may include a command to cause a PRBS to be generated, a command to cause a photographing time control signal for each camera to generated by performing a time delay on the PRBS using a different offset, and a command to cause the photographing time control signal to be transmitted to each camera.

The at least one command may further include a command to cause signals for controlling the positions of the one or more cameras to be provided to the respective cameras.

The command to cause the signals for controlling the positions of the one or more cameras to be provided to the respective cameras may include a command to cause a PRN to be generated, a command to cause position coordinates of each camera to be randomly set according to a camera photographing start time on the basis of the PRN, a command to cause a position control signal for moving each camera to the corresponding position coordinates to be generated, and a command to cause the position control signal to be transmitted to each camera.

In this case, the position control signal may include a PTZ control signal.

According to the embodiments of the present invention as described above, a plurality of cameras and a single image analysis device are installed in association with each other, and a UAV invading a UAV protected region is detected through the cameras each randomly capturing an image at an arbitrary position at an arbitrary time so that the number of cameras used for UAV detection may be minimized and the number of devices for analyzing the images captured by the cameras may be reduced, thereby reducing the cost required for the system.

As is apparent from the above, the number of cameras used for UAV detection can be minimized and the number of apparatuses for analyzing images captured by the cameras can be reduced, thereby reducing the cost required for a system.

Therefore, when a UAV protected region is constructed such that a small UAV having a small effective area that may not be detected through radar is detected through camera images, the UAV can be detected only with a small number of cameras so that damage caused by unauthorized intrusion of UAVs can be prevented.

The operations of the methods according to the embodiments of the present invention may be implemented in the form of programs or codes readable by computer devices and may be recorded in a computer readable media. The computer readable recording medium includes all types of recording devices configured to store data readable by computer systems. In addition, the computer-readable recording medium may be distributed over network-connected computer systems so that computer readable codes may be stored and executed in a distributed manner.

Examples of the computer readable storage medium include a hardware device constructed to store and execute a program command, for example, a ROM, a RAM, and a flash memory. The program command may include a highlevel language code executable by a computer through an interpreter in addition to a machine language code made by a compiler.

Although some aspects have been described in the context of an apparatus, it is clear that these aspects also represent a description of the corresponding method, where a block or device corresponds to a method step or a feature of a method step. Analogously, aspects described in the context of a method also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While the exemplary embodiments of the present invention have been described above, those of ordinary skill in the art should understand that various changes, substitutions and alterations may be made herein without departing from the spirit and scope of the present invention as defined by the following claims.

What is claimed is:

1. A method of detecting an unmanned aerial vehicle (UAV), the method comprising:
   generating a pseudo random binary sequence (PRBS);
   performing a time delay on the PRBS using a different offset to generate a photographing time control signal as the control signal for one or more cameras positioned in a UAV protected area;
   transmitting the generated photographing time control signal to each of the one or more cameras;
   controlling variably photographing time periods and photographing target areas of the one or more cameras;
   receiving images from the one or more cameras; and
   analyzing the received images to extract a UAV from the received images,
   wherein the controlling includes controlling the photographing time periods and the photographing target areas based on the control signal generated by the random sequence including the PRBS.

2. The method of claim 1, wherein the photographing target areas covered by the one or more cameras are set to be smaller than an area of the UAV protected area.

3. The method of claim 1, wherein installation positions of the one or more cameras are randomly set, and a focal length of each of the one or more cameras is fixedly set after zooming.

4. The method of claim 1, wherein the controlling includes controlling the photographing time periods and the photographing target areas based on randomly generated combinations of the photographing time periods and the photographing target areas.

5. The method of claim 1, further comprising:
   randomly setting position coordinates of each of the one or more cameras according to a photographing start time of the camera on the basis of the PRN;
   generating a position control signal for moving each of the one or more cameras to the corresponding position coordinates; and
   transmitting the position control signal as the control signal to each of the one or more cameras.

6. The method of claim 5, wherein the position control signal includes a Pan-Tilt-Zoom (PTZ) control signal.

7. An apparatus for detecting an unmanned aerial vehicle (UAV), the apparatus comprising:
   a processor; and
   a memory which stores at least one command to be executed through the processor,
   wherein the at least one command causes the processor to:
      generate a pseudo random binary sequence (PRBS);
      cause a time delay on the PRBS to be performed using a different offset to generate a photographing time control signal as the control signal for one or more cameras in a UAV protected area;
      cause the generated photographing time control signal to be transmitted to each of the one or more cameras;
      control variably photographing time periods and photographing target areas of the one or more cameras;
      receive images collected from the one or more cameras; and
      analyze the received images to extract a UAV from the received images,
   wherein the at least one command further causes the processor to control the photographing time periods and the photographing target areas based on the control signal generated by the random sequence including the PRBS.

8. The apparatus of claim 7, wherein the photographing target areas covered by the one or more cameras are set to be smaller than an area of a UAV protected area.

9. The apparatus of claim 7, wherein installation positions of the one or more cameras are randomly set, and a focal length of each of the one or more cameras is fixedly set after zooming.

10. The apparatus of claim 7, wherein the at least one command further causes the processor to control the photographing time periods and the photographing target areas based on randomly generated combinations of the photographing time periods and the photographing target areas.

11. The apparatus of claim 7, wherein the at least one command further causes the processor to:
   cause a pseudo random number (PRN) to be generated;
   cause randomly set position coordinates of each of the one or more cameras according to a photographing start time of the camera on the basis of the PRN;
   cause a position control signal for moving each of the one or more cameras to the corresponding position coordinates to be generated; and
   cause the position control signal to be transmitted to each of the one or more cameras as the control signal.

12. The apparatus of claim 11, wherein the position control signal includes a Pan-Tilt-Zoom (PTZ) control signal.

13. The method of claim 1, wherein the analyzing includes:
   providing the received image to a trained UAV detection model; and
   generating data related to the extracted UAV by the inference of the trained UAV detection model.

14. The apparatus of claim 7, wherein the at least one command further causes the processor to:
   provide the received image to a trained UAV detection model; and generate data related to the extracted UAV by the inference of the trained UAV detection model.

* * * * *